United States Patent
Fukushima et al.

(10) Patent No.: US 11,219,953 B2
(45) Date of Patent: Jan. 11, 2022

(54) COATED CUTTING TOOL

(71) Applicant: TUNGALOY CORPORATION, Fukushima (JP)

(72) Inventors: Naoyuki Fukushima, Iwaki (JP); Yusuke Hirano, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 34 days.

(21) Appl. No.: 16/925,976

(22) Filed: Jul. 10, 2020

(65) Prior Publication Data

US 2021/0023627 A1 Jan. 28, 2021

(30) Foreign Application Priority Data

Jul. 24, 2019 (JP) .............................. JP2019-135941

(51) Int. Cl.
*B23B 27/14* (2006.01)
*C23C 28/00* (2006.01)
*C23C 28/04* (2006.01)

(52) U.S. Cl.
CPC .......... *B23B 27/148* (2013.01); *C23C 28/042* (2013.01); *C23C 28/044* (2013.01); *C23C 28/42* (2013.01); *B23B 2224/24* (2013.01); *B23B 2228/105* (2013.01)

(58) Field of Classification Search
CPC . B23B 27/14; B23B 27/148; B23B 2228/105; B23C 5/16; B23C 2224/24; C23C 16/34

USPC ........................................ 428/697, 698, 699
See application file for complete search history.

(56) References Cited

U.S. PATENT DOCUMENTS

| 10,307,830 | B2 | 6/2019 | Tatsuoka et al. |
| 2015/0158094 | A1* | 6/2015 | Igarashi ................ C23C 28/044 428/216 |
| 2017/0165758 | A1* | 6/2017 | Tatsuoka ................. B23B 27/14 |

FOREIGN PATENT DOCUMENTS

| JP | 2015-214015 A | 12/2015 |
| JP | 2019-010707 A | 1/2019 |

* cited by examiner

*Primary Examiner* — Archene A Turner
(74) *Attorney, Agent, or Firm* — Studebaker & Brackett PC

(57) ABSTRACT

A cutting tool comprising a substrate and a coating layer formed on the substrate, wherein the coating layer has, from a side closer to the substrate, a lower layer that contains a compound having a composition represented by $(Al_xTi_{1-x})N$, and an upper layer that is formed on the lower layer and contains a compound having a composition represented by $(Al_yTi_{1-y})N$; the average thickness of the lower layer is 1.0 µm or more and 10.0 µm or less; the average thickness of the upper layer is 1.0 µm or more and 10.0 µm or less; and an area ratio $GOS_l$ of crystal grains having a GOS value of 1 degree or lower in the lower layer and an area ratio $GOS_s$ of crystal grains having a GOS value of 1 degree or lower in the upper layer satisfy $GOS_l < GOS_s$.

20 Claims, 1 Drawing Sheet

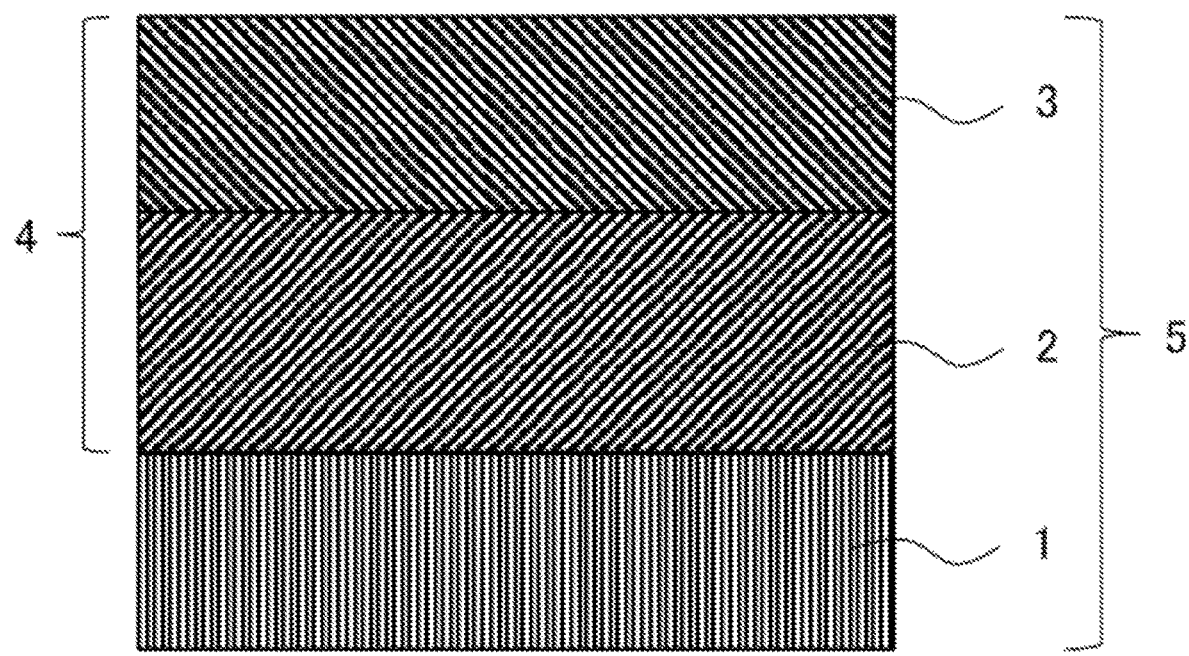

COATED CUTTING TOOL

TECHNICAL FIELD

The present invention relates to a coated cutting tool.

BACKGROUND ART

It has been conventionally well known to employ, for the cutting of steel, cast iron, etc., a coated cutting tool which is obtained by depositing, via chemical vapor deposition, a coating layer with a total thickness of from 3 μm or more to 20 μm or less on a surface of a substrate consisting of a cemented carbide. A known example of the above coating layer is a coating layer consisting of a single layer of one kind selected from the group consisting of a Ti carbide, a Ti nitride, a Ti carbonitride, a Ti carboxide, a Ti carboxynitride, and aluminum oxide ($Al_2O_3$), or consisting of multiple layers of two or more kinds selected therefrom.

Further, coated tools are known in which a Ti—Al-based composite nitride layer is formed by vapor deposition on the surface of a substrate consisting of a cemented carbide or a cubic boron nitride sintered body by a physical vapor deposition method, and such cutting tools are known to exhibit excellent wear resistance. However, although the conventional coated tools in which the Ti—Al-based composite nitride layer is formed by the physical vapor deposition method are comparatively excellent in wear resistance, since cracks tend to occur when such cutting tools are used under cutting conditions under which high-speed machining is performed with an intermittently applied load, various improvements of the coating layer have been suggested.

For example, Patent Publication JP-A-2015-214015 discloses a surface-coated cutting tool in which a hard coating layer is provided on the surface of a tool substrate configured of any one of a tungsten carbide-based cemented carbide, a titanium carbonitride-based cermet or a cubic boron nitride-based ultrahigh-pressure sintered body, wherein the following conditions (a) to (c) are satisfied.

(a) Where the hard coating layer includes a layer of at least a composite nitride or composite carbonitride of Ti and Al having an average layer thickness of 1 μm to 20 μm formed by a chemical vapor deposition method, and has a composition formula: $(Ti_{1-x}Al_x)(C_yN_{1-y})$, the average amount ratio $x_{avg}$ of Al in the total amount of Ti and Al in the composite nitride or composite carbonitride layer and the average amount ratio $y_{avg}$ of in the total amount of C in the total amount of C and N in the composite nitride or composite carbonitride layer ($x_{avg}$ and $y_{avg}$ are both atomic ratios) satisfy $0.60 \leq x_{avg} \leq 0.95$ and $0 \leq y_{avg} \leq 0.005$, respectively.

(b) The composite nitride or composite carbonitride layer includes at least a phase of a composite nitride or composite carbonitride of Ti and Al having a NaCl-type face-centered cubic structure.

(c) Where the crystal orientation of crystal grains of the composite nitride or composite carbonitride of Ti and Al having the NaCl-type face-centered cubic structure is analyzed from the longitudinal section direction by using an electron beam backscattering diffractometer, and an average misorientation in a crystal grain is determined in each crystal grain, the crystal grains having the average misorientation in a crystal grain of 2 degrees or larger are present in an area ratio of 40% or more in the composite nitride or composite carbonitride layer.

SUMMARY

Technical Problem

An increase in speed, feed and depth of cut has become more conspicuous in cutting in recent times, and wear resistance and fracture resistance of a tool are required to be further improved compared to those involved in the prior art. In addition, the increased complexity of machined shapes has increased, as compared with prior art, the number of machining processes in which an intermittent load is applied to the tool, and under such severe cutting conditions, conventional tools are more prone to fracture due to thermal cracks, which makes it difficult to extend the tool life. The thermal crack is a crack generated by thermal stress and thermal fatigue caused by intermittent cutting. Thermal cracks usually occur first in the direction perpendicular to the cutting edge, and also in the horizontal direction as the cutting time elapses.

In the surface-coated cutting tool disclosed in Patent Publication JP-A-2015-214015, since the crystal grains having the average misorientation in a crystal grain (hereinafter also referred to as "GOS value") of 2 degrees or larger are present in an area ratio of 40% or more in the composite nitride or composite carbonitride layer, strains are generated in the crystal grains, so that improvement in hardness and toughness of the crystal grains can be expected. However, when the GOS value is large, the distribution of strains in the crystal grains is not uniform, so when the number of crystal grains with a large GOS value increases, the number of locations where cracks originate increases, and the thermal crack resistance of the surface-coated cutting tool tends to deteriorate.

The present invention has been made in view of the above circumstances, and it is an object thereof to provide a surface-coated cutting tool in which the generation of thermal cracks is suppressed even under cutting conditions under which a load acts at high speed, so that fracture resistance can be improved and wear resistance can be also improved, thereby making it possible to extend the tool life.

Solution to Problem

The present inventors have conducted research on the extension of the tool life of coated cutting tools, and have found that where a coated cutting tool has a specific configuration, the generation of thermal cracks is suppressed even under cutting conditions under which a load acts at high speed, so that fracture resistance can be improved and wear resistance can be also improved, thereby making it possible to extend the tool life, and this has led to the completion of the present invention.

Namely, the present invention is as set forth below

[1]

A cutting tool comprising a substrate and a coating layer formed on the substrate, wherein the coating layer comprises, in the order from a side closer to the substrate, a lower layer that comprises a compound having a composition represented by following formula (1), and an upper layer that is formed on the lower layer and comprises a compound having a composition represented by following formula (2),

   (1)

in the formula (1), x represents an atomic ratio of the Al element to a total of the Al element and the Ti element, and satisfies $0.60 \leq x \leq 0.95$,

   (2)

in the formula (2), y represents an atomic ratio of the Al element to a total of the Al element and the Ti element, and satisfies $0.50 \leq y \leq 0.85$;

an average thickness of the lower layer is 1.0 μm or more and 10.0 μm or less, and the average thickness of the upper layer is 1.0 μm or more and 10.0 μm or less; and an area ratio $GOS_i$ of crystal grains having a GOS value of 1 degree or lower in the lower layer and an area ratio $GOS_s$ of crystal grains having a GOS value of 1 degree or lower in the upper layer satisfy a condition represented by following formula (3), $$GOS_i < GOS_s \quad (3)$$

[2]

The cutting tool according to [1], wherein a ratio $KAM_i$ of measurement points showing a KAM value of 1 degree or lower in the lower layer is 50% or more and 90% or less, and a ratio $KAM_s$ of measurement points showing a KAM value of 1 degree or lower in the upper layer is 50% or more and 95% or less.

[3]

The coated cutting tool according to [1] or [2], wherein the $GOS_s$ is 55% or more and 90% or less.

[4]

The coated cutting tool according to any one of [1] to [3], wherein the $GOS_i$ is 10% or more and less than 55%.

[5]

The coated cutting tool according to any one of [1] to [4], wherein the atomic ratio x of the Al element in the lower layer and the atomic ratio y of the Al element in the upper layer satisfy a condition represented by following formula (4):

$$y < x \quad (4)$$

[6]

The coated cutting tool according to any one of [1] to [5], wherein an average thickness of the entire coating layer is 3.0 μm or more and 15.0 μm or less.

[7]

The coated cutting tool according to any one of [1] to [6], wherein the substrate is any of a cemented carbide, a cermet, a ceramic, and a cubic boron nitride sintered body.

Advantageous Effects of Invention

In the coated cutting tool of the present invention, the generation of thermal cracks is suppressed even under cutting conditions under which a load acts at high speed, so that fracture resistance can be improved and wear resistance can be also improved, thereby making it possible to extend the tool life.

BRIEF DESCRIPTION OF DRAWINGS

The FIGURE is a schematic cross-sectional view showing an example of a coated cutting tool according to the present invention.

DESCRIPTION OF EMBODIMENTS

An embodiment for carrying out the present invention (hereinafter simply referred to as the "present embodiment") will hereinafter be described in detail, with reference to the attached drawings as appropriate. However, the present invention is not limited to the present embodiment below. Various modifications may be made to the present invention without departing from the gist of the invention. It should be noted that, in the drawings, unless otherwise specified, positional relationships, such as vertical and horizontal relationships, are based on the positional relationships shown in the drawings. Further, the dimensional ratios of the drawings are not limited to those shown therein.

The coated cutting tool of the present embodiment comprises a substrate and a coating layer formed on the substrate, wherein the coating layer has, from a side closer to the substrate, a lower layer that contains a compound having a composition represented by the following formula (1), and an upper layer that is formed on the lower layer and contains a compound having a composition represented by the following formula (2), $$(Al_xTi_{1-x})N \quad (1)$$

in the formula (1), x represents an atomic ratio of the Al element to a total of the Al element and the Ti element, and satisfies $0.60 \leq x \leq 0.95$, $$(Al_yTi_{1-y})N \quad (2)$$

in the formula (2), y represents an atomic ratio of the Al element to a total of the Al element and the Ti element, and satisfies $0.50 \leq y \leq 0.85$;

an average thickness of the lower layer is 1.0 μm or more and 10.0 μm or less, and the average thickness of the upper layer is 1.0 μm or more and 10.0 μm or less; and an area ratio $GOS_i$ of crystal grains having a GOS value of 1 degree or lower in the lower layer and an area ratio $GOS_s$ of crystal grains having a GOS value of 1 degree or lower in the upper layer satisfy a condition represented by following formula (3), $$GOS_i < GOS_s \quad (3)$$

Because the coated cutting tool of the present embodiment is provided with the above configuration, the generation of thermal cracks is suppressed even under cutting conditions under which a load acts at high speed, so that the fracture resistance can be improved and the wear resistance can be also improved, thereby making it possible to extend the tool life. The factors that improve the wear resistance and fracture resistance of the coated cutting tool of the present embodiment are considered as follows. However, the present invention is not limited to the following factors. That is, first, in the coated cutting tool of the present embodiment, where x in the formula (1) is 0.60 or more in the lower layer that contains the compound having the composition represented by the formula (1), the wear resistance is improved due to increase in hardness caused by solid solution strengthening, and oxidation resistance is improved due to increase in Al amount. As a result, in the coated cutting tool of the present embodiment, the crater wear resistance is improved, so that the decrease in strength of the cutting edge is suppressed, thereby increasing the fracture resistance. Meanwhile, in the coated cutting tool of the present embodiment, where x in the formula (1) is 0.95 or less in the lower layer that contains the compound having the composition represented by the formula (1), the toughness is improved because Ti is contained, so that the fracture resistance is improved. Further, in the coated cutting tool of the present embodiment, where y in the formula (2) is 0.50 or more in the upper layer that contains the compound having the composition represented by the formula (2), the wear resistance is improved due to increase in hardness caused by solid solution strengthening, and oxidation resistance is improved due to increase in Al amount. As a result, in the coated cutting tool of the present embodiment, the crater wear resistance is improved, so that the decrease in strength of the cutting edge is suppressed, thereby increasing the fracture resistance. Meanwhile, in the coated cutting tool of the present embodiment, where y in the formula (2) is 0.85 or less in the upper layer that contains the compound having the composition represented by the formula (2), the toughness is improved because Ti is contained, so that the fracture resistance is improved. Further, when the $GOS_l$ in the lower layer is lower than the $GOS_s$ in the upper layer, it is possible to improve the fracture resistance and also improve the wear resistance by suppressing the generation of thermal cracks. A lower area ratio of $GOS_l$ in the lower layer means that crystal grains having high hardness are dispersed. In other words, in the lower layer, the area ratio of the crystal grains having a GOS value larger than 1 degree, that is, the crystal grains having a large strain, increases. Therefore, where the average thickness of the lower layer is 1.0 μm or more, the wear resistance of the coated cutting tool is improved. Meanwhile, where the average thickness of the lower layer is 10.0 μm or less, the adhesion between the substrate and the coating layer can be further enhanced, so that the fracture resistance of the coated cutting tool is improved. Further, a higher area ratio of $GOS_s$ in the upper layer means that the effect of suppressing the generation of thermal cracks is enhanced. Therefore, where the average thickness of the upper layer is 1.0 μm or more, the fracture resistance of the coated cutting tool is improved. Meanwhile, where the average thickness of the upper layer is 10.0 μm or less, the adhesion is improved, thereby enhancing the effect of suppressing the occurrence of peeling. Therefore, the fracture resistance of the coated cutting tool is improved. It is considered that by combining these features, the coated cutting tool of the present embodiment has improved wear resistance and fracture resistance, and as a result, the tool life can be extended.

The FIGURE is a schematic sectional view showing an example of the coated cutting tool of the present embodiment. A coated cutting tool 5 comprises a substrate 1 and a coating layer 4 formed on the surface of the substrate 1. In the coating layer 4, a lower layer 2 and an upper layer 3 are stacked upward in this order from the substrate side.

The coated cutting tool according to the present embodiment comprises a substrate and a coating layer formed on the surface of the substrate. Specific examples of the type of the coated cutting tool comprise an interchangeable cutting insert for milling or turning, a drill, and an end mill.

The substrate used in the present embodiment is not particularly limited as long as it may be used for a coated cutting tool. Examples of such a substrate comprise a cemented carbide, a cermet, a ceramic, a cubic boron nitride sintered body, a diamond sintered body, and high-speed steel. Among them, the substrate is preferably a cemented carbide, a cermet, a ceramic or a cubic boron nitride sintered body, because more excellent wear resistance and fracture resistance can be realized, and from the same viewpoint, the substrate is more preferably a cemented carbide.

The surface of the substrate may be modified. For example, where the substrate is composed of a cemented carbide, a β-free layer may be formed on the surface thereof. Further, where the substrate is made of a cermet, a hardened layer may be formed on the surface. Even if the surface of the substrate is modified as described above, the function and effect of the present invention can be obtained.

The average thickness of the entire coating layer used in the present embodiment is preferably 3.0 μm or more and 15.0 μm or less. Where the average thickness of the entire coating layer is 3.0 μm or more, the wear resistance is improved, and where the average thickness of the coating layer is 15.0 μm or less, the adhesion and fracture resistance of the coating layer to the substrate are improved. From the same viewpoint, the average thickness of the coating layer is more preferably 4.0 μm or more and 13.0 μm or less, further preferably 5.0 μm or more and 12.0 μm or less. The average thickness of each layer and the entire coating layer in the coated cutting tool of the present embodiment can be obtained by measuring the thickness of each layer or the thickness of the entire coating layer from cross sections in three or more locations of each layer or the entire coating layer and calculating the arithmetic mean value.

A calculation method for quantifying strain in a crystal grain by an electron backscatter diffraction (hereinafter also referred to as "EBSD") method using a scanning electron microscope can be exemplified by Grain Orientation Spread (hereinafter also referred to as "GOS") that quantifies the average misorientation in a crystal grain and Kernel Average Misorientation (hereinafter also referred to as "KAM") that quantifies the misorientation between an arbitrary measurement point and a measurement point close thereto in a crystalline grain. The GOS value and the KAM value will be described below.

GOS Value

When the GOS value is small, the distribution of strain within the crystal grains becomes close to uniform. Where the area ratio of the crystal grains having a small GOS value is increased, the number of places that are the starting points of crack generation is reduced, and the generation of thermal cracks can be suppressed. Meanwhile, when the GOS value is large, the strain of crystal grains is large. Where the area ratio of the crystal grains having a large GOS value is increased, the hardness becomes high, so that the wear resistance is improved.

In the coated cutting tool of the present embodiment, the area ratio $GOS_l$ of the crystal grains having a GOS value of 1 degree or lower in the lower layer and the area ratio $GOS_s$ of the crystal grains having a GOS value of 1 degree or lower in the upper layer satisfy the condition represented by the following formula (3).

$$GOS_l < GOS_s \tag{3}$$

Where the $GOS_l$ in the lower layer is lower than the $GOS_s$ in the upper layer, it is possible to improve the fracture resistance and also improve the wear resistance by suppressing the generation of thermal cracks.

Further, the $GOS_l$ in the lower layer is preferably 10% or more and less than 55%, more preferably 10% or more and 50% or less, further preferably 12% or more and 42% or less, and particularly preferable 14% or more and 36% or less. Where the $GOS_l$ in the lower layer is less than 55%, the GOS value is larger than 1 degree, that is, the crystal grains having a large strain and a high hardness are sufficiently dispersed, whereby the hardness is improved and the wear resistance of the coated cutting tool tends to be further improved. Meanwhile, where the $GOS_l$ in the lower layer is 10% or more, the production is facilitated.

Further, the $GOS_s$ in the upper layer is preferably 50% or more and 90% or less, more preferably 53% or more and 90% or less, further preferably 55% or more and 90% or less, even more preferably 55% or more and 88% or less, and particularly preferably 55% or more and 86% or less. Where the $GOS_s$ in the upper layer is 50% or more, the number of places that are the starting points of crack generation is reduced, and the generation of thermal cracks can be further suppressed. Meanwhile, where the $GOS_s$ in the upper layer is 90% or less, the production is facilitated.

In the present embodiment, the GOS value can be measured as follows. In the sample of a coated cutting tool, a cross section is exposed by polishing in a direction substantially parallel to the substrate surface at 0.5 µm from the surface of the lower layer or the upper layer toward the substrate. Using EBSD (manufactured by TexSEM Laboratories, Inc.), each measurement region of the cross section in the lower layer and the upper layer is divided into regular hexagonal measurement points (hereinafter also referred to as "pixels"). As to each of the divided pixels, the orientation of the pixel is measured by obtaining Kikuchi patterns from reflected electrons from an electron beam which has been incident on the cross section (polished surface) of the sample. The obtained orientation data is analyzed using analysis software for the EBSD, thereby calculating various parameters. The measurement conditions are as set forth below: the acceleration voltage is 15 kV, the size of the measurement region is 30 µm×50 µm, and the distance (step size) between adjacent pixels is 0.05 µm. When there is a misorientation of 5 degrees or more between adjacent pixels, it is defined as a grain boundary. Further, a region surrounded by grain boundaries is defined as one crystal grain. However, a pixel that is present independently with a misorientation of 5 degrees or more with all the adjacent pixels is not considered to be a crystal grain, and two or more pixels connected together are treated as a crystal grain.

Further, the misorientation in a crystal grain between two different pixels in the same crystal grain is calculated, and the averaged value thereof is defined as the GOS value. That is, the GOS value can be expressed by following formula (5).

$$GOS = \frac{\sum_{i,j=1}^{n} \alpha_{ij}(i \neq j)}{n(n-1)} \quad (5)$$

in the formula (5), n represents the number of pixels in the same crystal grain, i and j represent numbers assigned to different pixels in the crystal grain, where 1≤i and j≤n), $\alpha_{ij}$ (i≠j) represents the crystal misorientation obtained from the crystal orientation at pixel i and the crystal orientation at pixel j.

The measurement under the abovementioned measurement conditions and measurement range is carried out in five fields of view. Next, the total number of pixels belonging to the crystal grains (for example, cubic crystals) that constitute the lower layer or the upper layer is obtained, the GOS value is divided at intervals of 1 degree, and the number of pixels in the crystal grains in which the GOS value is included in the range of this value is aggregated and divided by the total number of pixels to create a histogram indicating the area ratio of the GOS value in the lower layer or the upper value. The area ratio $GOS_i$ of the crystal grains having a GOS value of 1 degree or lower in the lower layer and the area ratio $GOS_s$ of the crystal grains having a GOS value of 1 degree or lower in the upper layer can be obtained based on the created histogram.

KAM Value

The KAM value is a numerical value indicating a local misorientation which is a difference in crystal orientation between adjacent measurement points in a crystal orientation analysis based on the EBSD method. The larger the KAM value, the larger the difference in crystal orientation between adjacent measurement points, and the smaller the KAM value, the smaller the local strain in the crystal grains.

In the coated cutting tool of the present embodiment, it is preferable that the ratio $KAM_i$ of the measurement points at which the KAM value is 1 degree or lower be 50% or more and 90% or less in the lower layer. Where the $KAM_i$ is 50% or more, the strain in the crystal grains is small, so that the toughness is improved and the generation of thermal cracks tends to be further suppressed. Meanwhile, it is preferable that the $KAM_i$ be 90% or less because the production is facilitated. From the same viewpoints, the $KAM_i$ is more preferably 52% or more and 85% or less, and further preferably 52% or more and 79% or less.

Further, in the coated cutting tool of the present embodiment, it is preferable that the ratio $KAM_s$ of the measurement points at which the KAM value is 1 degree or lower be 50% or more and 95% or less in the upper layer. Where the $KAM_s$ is 50% or more, the strain in the crystal grains is small, so that the toughness is improved and the generation of thermal cracks tends to be further suppressed. Meanwhile, where the $KAM_s$ is 95% or less, the production is facilitated. From the same viewpoints, it is more preferable that $KAM_s$ be 52% or more and 91% or less.

In the coated cutting tool of the present embodiment, when the $KAM_i$ and $KAM_s$ are in the above ranges, the strain in the crystal grains becomes small in the entire upper layer and lower layer, and the generation of thermal cracks tends to be further suppressed.

In the present embodiment, the KAM value can be measured as follows. In the sample of a coated cutting tool, a cross section is exposed by polishing in a direction substantially parallel to the substrate surface at 0.5 µm from the surface of the lower layer or the upper layer toward the substrate. Using EBSD (manufactured by TexSEM Laboratories, Inc.), each measurement region of the cross section in the lower layer and the upper layer is divided into regular hexagonal measurement points (hereinafter also referred to as "pixels"). As to each of the divided pixels, the orientation of the pixel is measured by obtaining Kikuchi patterns from reflected electrons from an electron beam which has been incident on the cross section (polished surface) of the sample. The obtained orientation data is analyzed using analysis software for the EBSD, thereby calculating various parameters. The measurement conditions are as set forth below: the acceleration voltage is 15 kV, the size of the measurement region is 30 µm×50 µm, and the distance (step size) between adjacent pixels is 0.05 µm. From among the pixels adjacent to a pixel serving as a measurement center, pixels which each have a misorientation of 5 degrees or more with respect to such pixel are excluded from the calculation of KAM values as such excluded pixels are each regarded as straddling the grain boundary of the monocrystal where the pixel serving as a measurement center is located. That is, a KAM value is obtained as an average value of the misorientation of a pixel located in a crystal grain and the misorientations of the pixels which are adjacent to such pixel and which do not straddle the grain boundary of such crystal grain. That is, the KAM value can be expressed by the following formula (6).

$$KAM = \frac{\sum_{j=1}^{n} \alpha_{i,j}}{n} \quad (6)$$

in the formula (6), n represents the number of pixels j adjacent to an arbitrary pixel i in the same crystal grain, and $\alpha_{i,j}$ represents the crystal misorientation obtained from the crystal orientation at the pixel i and the crystal orientation at the pixel j.

Then, the KAM value at all pixels constituting the entire area of the measurement region is calculated in the lower layer or the upper layer, and the ratio of the measurement points (pixels) with the KAM value of 1 degree or lower when the total number of the measurement points (pixels) is taken as 100% is determined. The ratio of the measurement points at which the KAM value is 1 degree or lower is a numerical value obtained by averaging the ratios obtained for the measurement regions at any three locations. Further, the ratio of the measurement points where the KAM value is 1 degree or lower in the lower layer is represented as $KAM_l$, and the ratio of the measurement points where the KAM value is 1 degree or lower in the upper layer is represented as $KAM_s$.

Lower Layer

The lower layer used in the present embodiment contains a compound having a composition represented by the following formula (1).

$$(Al_xTi_{1-x})N \quad (1)$$

in the formula (1), x represents an atomic ratio of the Al element to a total of the Al element and the Ti element, and satisfies $0.60 \leq x \leq 0.95$.

In the coated cutting tool of the present embodiment, where x in the formula (1) is 0.60 or more in the lower layer that contains the compound having the composition represented by the formula (1), solid solution strengthening increases the hardness, so that the wear resistance is improved, and since the Al amount is increased, the oxidation resistance is improved. As a result, in the coated cutting tool of the present embodiment, the crater wear resistance is improved, so that a decrease in strength of the cutting edge is suppressed, thereby improving the fracture resistance. Meanwhile, in the coated cutting tool of the present embodiment, where x in the formula (1) is 0.95 or less in the lower layer that contains the compound having the composition represented by the formula (1), since Ti is contained, the toughness is improved, and thus the fracture resistance is improved. From the same viewpoints, x in the formula (1) is preferably 0.64 or more and 0.92 or less, and more preferably 0.80 or more and 0.90 or less.

The average thickness of the lower layer used in the present embodiment is 1.0 μm or more and 10.0 μm or less. Where the average thickness of the lower layer is 1.0 μm or more, the wear resistance of the coated cutting tool is improved. Meanwhile, where the average thickness of the lower layer is 10.0 μm or less, the adhesion between the substrate and the coating layer can be further enhanced, so that the fracture resistance of the coated cutting tool is improved. From the same viewpoints, the average thickness of the lower layer is more preferably 1.5 μm or more and 8.5 μm or less, and further preferably 2.0 μm or more and 7.0 μm or less.

Upper Layer

The upper layer used in the present embodiment contains a compound having a composition represented by the following formula (2).

$$(Al_yTi_{1-y})N \quad (2)$$

in the formula (2), y represents an atomic ratio of the Al element to a total of the Al element and the Ti element, and satisfies $0.50 \leq y \leq 0.85$.

In the coated cutting tool of the present embodiment, where y in the formula (2) is 0.50 or more in the upper layer that contains the compound having the composition represented by the formula (2), solid solution strengthening increases the hardness, so that the wear resistance is improved, and since the Al amount is increased, the oxidation resistance is improved. As a result, in the coated cutting tool of the present embodiment, the crater wear resistance is improved, so that a decrease in strength of the cutting edge is suppressed, thereby improving the fracture resistance. Meanwhile, in the coated cutting tool of the present embodiment, where y in the formula (2) is 0.85 or less in the upper layer including the compound having the composition represented by the formula (2), since Ti is contained, the toughness is improved, and thus the fracture resistance is improved. From the same viewpoints, y in the formula (2) is preferably 0.52 or more and 0.83 or less, and more preferably 0.70 or more and 0.80 or less.

In the coated cutting tool of the present embodiment, it is preferable that the atomic ratio x of the Al element in the lower layer and the atomic ratio y of the Al element in the upper layer satisfy the condition represented by the following formula (4).

$$y < x \quad (4)$$

When the atomic ratio x of the Al element in the lower layer and the atomic ratio y of the Al element in the upper layer satisfy the relation of $y<x$, the hardness of the upper layer is lowered and the toughness tends to be improved. As a result, the generation of thermal cracks is suppressed, and the fracture resistance of the coated cutting tool tends to be improved. Further, the Al amount can be maximized by controlling the GOS value as described above, rather than merely increasing the Ti amount in the upper layer to improve the toughness. This tends to improve the oxidation resistance of the coated cutting tool and improve the crater wear resistance. As a result, the strength of the cutting edge of the coated cutting tool is improved, so that the fracture resistance tends to be improved.

The average thickness of the upper layer used in the present embodiment is preferably 1.0 μm or more and 10.0 μm or less. Where the average thickness of the upper layer is 1.0 μm or more, the fracture resistance of the coated cutting tool is improved. Meanwhile, where the average thickness of the upper layer is 10.0 μm or less, the adhesion is improved, and the effect of suppressing the occurrence of peeling is increased. Therefore, the fracture resistance of the coated cutting tool is improved. From the same viewpoints, the average thickness of the upper layer is more preferably 1.5 μm or more and 8.0 μm or less, and further preferably 2.0 μm or more and 5.0 μm or less.

Method for Forming Coating Layer

For example, the following methods can be used for forming each layer constituting the coating layer in the coated cutting tool of the present embodiment. However, these methods for forming the layers are not limiting.

The lower layer can be formed by chemical vapor deposition at a temperature of 700° C. to 900° C. and a pressure of 3 hPa to 5 hPa by using a raw material composition of $TiCl_4$: 0.2 mol % to 0.5 mol %, $AlCl_3$: 0.5 mol % to 1.5 mol %, $NH_3$: 2.0 mol % to 5.0 mol %, and $H_2$: balance.

The upper layer can be formed by chemical vapor deposition at a temperature of 700° C. to 900° C. and a pressure of 3 hPa to 5 hPa by using a raw material composition of $TiCl_4$: 0.3 mol % to 0.8 mol %, $AlCl_3$: 0.5 mol % to 1.0 mol %, $NH_3$: 1.0 mol % to 5.0 mol %, and $H_2$: balance.

First, the lower layer is formed on the substrate surface. Then, the upper layer is formed on the lower layer.

Further, in order to control the composition represented by the formulas (1) and (2), the raw material composition may be adjusted as appropriate. More specifically, as a method for controlling the ratio of Ti and Al, for example, where the ratio of $AlCl_3/(AlCl_3+TiCl_4)$ in the raw material composition is increased, the Al amount ratio tends to increase. Specifically, for example, by setting the ratio of $AlCl_3/(AlCl_3+TiCl_4)$ in the raw material composition to 0.6 or more and 0.85 or less, the amount ratio of Al in the formula (1) can be controlled within the above specific range. Further, for example, by setting the ratio of $AlCl_3/(AlCl_3+TiCl_4)$ in the raw material composition to 0.5 or more and 0.77 or less, the amount ratio of Al in the formula (2) can be controlled within the above specific range.

Further, in order to increase the area ratio of the crystal grains having a GOS value of 1 degree or lower (to reduce the strain of the crystal grains), for example, the ratio of $NH_3$ in the raw material composition can be reduced, or the forming temperature can be increased. Meanwhile, in order to reduce the area ratio of the crystal grains having a GOS value of 1 degree or lower (to increase the strain of the crystal grains), for example, the ratio of $NH_3$ in the raw material composition can be increased, or the forming temperature can be lowered.

Further, in order to increase the ratio of measurement points where the KAM value is 1 degree or lower (to reduce the strain of the crystal grains), for example, the ratio of $NH_3$ in the raw material composition can be decreased, or the forming temperature can be increased. Meanwhile, in order to reduce the ratio of measurement points where the KAM value is 1 degree or lower (to increase the strain of the crystal grains), for example, the ratio of $NH_3$ in the raw material composition can be increased, or the forming temperature can be lowered.

Further, where the temperature at the time of forming the upper layer after forming the lower layer is set to be 50° C. or higher than the temperature at the time of forming the lower layer, the area ratio of the crystal grains having a GOS value of 1 degree or lower can be increased (the strain of the crystal grains can be reduced) and $GOS_i < GOS_s$ can be satisfied.

The thickness of each layer in the coating layer of the coated cutting tool of the present embodiment can be measured by observing the cross-sectional structure of the coated cutting tool by using an optical microscope, a scanning electron microscope (SEM), a field emission scanning electron microscope (FE-SEM), or the like. In addition, the average thickness of each layer in the coated cutting tool of the present embodiment can be determined by measuring the thickness of each layer at three or more locations in the vicinity of a position of 50 μm from the edge line of the cutting edge toward the center of the rake surface of the coated cutting tool and determining the arithmetic mean value thereof. The composition of each layer can be measured from the cross-sectional structure of the coated cutting tool of the present embodiment by using an energy dispersive X-ray spectrometer (EDS), a wavelength dispersive X-ray spectrometer (WDS), or the like.

EXAMPLES

Hereinafter, the present invention will be described in more detail with reference to Examples, but the present invention is not limited to these Examples.

As a substrate, an insert of SNGU1307ANEN-MJ (a cemented carbide having a composition of 86.5% WC-11.7% Co-1.1% NbC-0.7% $Cr_3C_2$ (% by mass)) was prepared. After round honing was performed on the ridgeline of the cutting edge of this substrate with a SiC brush, the surface of the substrate was washed.

Invention Samples 1 to 13 and Comparative Samples 1 to 7

After washing the surface of the substrate, a coating layer was formed by the chemical vapor deposition method. First, the substrate was loaded into a chemical vapor deposition apparatus of an external heating type, and a lower layer having the composition shown in Table 3 was formed on the surface of the substrate under the conditions of raw material composition, temperature and pressure shown in Table 1 so as to obtain the average thickness shown in Table 3. Then, the upper layer having the composition shown in Table 3 was formed on the surface of the lower layer under the conditions of the raw material composition, temperature and pressure shown in Table 2 so as to obtain the average thickness shown in Table 3. Thus, the coated cutting tools of the invention samples 1 to 13 and the comparative samples 1 to 7 were obtained.

The thickness of each layer of each of the samples was obtained as set forth below. That is, using an FE-SEM, the average thickness was obtained by: measuring the thickness of each layer, from each of the cross-sectional surfaces at three locations near the position 50 μm from the edge of the coated cutting tool, toward the center of the rake surface thereof; and calculating the arithmetic mean of the resulting measurements. Using an EDS, the composition of each layer of the obtained sample was measured from the cross-sectional surface near the position 50 μm from the edge of the coated cutting tool, toward the center of the rake surface thereof.

TABLE 1

| | | | Lower layer | | | | |
|---|---|---|---|---|---|---|---|
| | Temperature | Pressure | Raw material composition (mol %) | | | | $AlCl_3/$ |
| Sample No. | (° C.) | (hPa) | $TiCl_4$ | $AlCl_3$ | $NH_3$ | $H_2$ | $(AlCl_3 + TiCl_4)$ |
| Invention sample 1 | 750 | 4 | 0.3 | 1.2 | 3.5 | 95.0 | 0.80 |
| Invention sample 2 | 750 | 4 | 0.3 | 1.2 | 3.5 | 95.0 | 0.80 |
| Invention sample 3 | 750 | 4 | 0.3 | 1.2 | 4.0 | 94.5 | 0.80 |
| Invention sample 4 | 750 | 3 | 0.3 | 1.2 | 3.5 | 95.0 | 0.80 |
| Invention sample 5 | 750 | 4 | 0.3 | 1.2 | 2.5 | 96.0 | 0.80 |
| Invention sample 6 | 750 | 4 | 0.2 | 0.5 | 3.5 | 95.8 | 0.71 |
| Invention sample 7 | 750 | 5 | 0.3 | 1.2 | 3.5 | 95.0 | 0.80 |
| Invention sample 8 | 750 | 4 | 0.2 | 1.2 | 2.5 | 96.1 | 0.85 |
| Invention sample 9 | 750 | 4 | 0.3 | 1.2 | 3.5 | 95.0 | 0.80 |
| Invention sample 10 | 750 | 4 | 0.3 | 1.2 | 3.5 | 95.0 | 0.80 |
| Invention sample 11 | 750 | 4 | 0.3 | 1.0 | 4.0 | 94.7 | 0.77 |

TABLE 1-continued

| | Lower layer | | | | | | |
|---|---|---|---|---|---|---|---|
| | Temperature | Pressure | Raw material composition (mol %) | | | | $AlCl_3/$ |
| Sample No. | (° C.) | (hPa) | $TiCl_4$ | $AlCl_3$ | $NH_3$ | $H_2$ | $(AlCl_3 + TiCl_4)$ |
| Invention sample 12 | 770 | 4 | 0.3 | 1.2 | 3.0 | 95.5 | 0.80 |
| Invention sample 13 | 750 | 4 | 0.3 | 1.5 | 3.5 | 94.7 | 0.83 |
| Comparative sample 1 | 750 | 4 | 0.3 | 1.2 | 3.0 | 95.5 | 0.80 |
| Comparative sample 2 | 750 | 4 | 0.3 | 1.2 | 3.0 | 95.5 | 0.80 |
| Comparative sample 3 | 750 | 4 | 0.3 | 1.2 | 3.0 | 95.5 | 0.80 |
| Comparative sample 4 | 750 | 4 | 0.3 | 1.2 | 5.0 | 93.5 | 0.80 |
| Comparative sample 5 | 900 | 4 | 0.3 | 1.2 | 3.0 | 95.5 | 0.80 |
| Comparative sample 6 | 750 | 4 | 0.5 | 0.5 | 3.0 | 96.0 | 0.50 |
| Comparative sample 7 | 750 | 4 | 0.3 | 1.2 | 4.0 | 94.5 | 0.80 |

TABLE 2

| | Upper layer | | | | | | |
|---|---|---|---|---|---|---|---|
| | Temperature | Pressure | Raw material composition (mol %) | | | | $AlCl_3/$ |
| Sample No. | (° C.) | (hPa) | $TiCl_4$ | $AlCl_3$ | $NH_3$ | $H_2$ | $(AlCl_3 + TiCl_4)$ |
| Invention sample 1 | 800 | 4 | 0.4 | 1.0 | 2.5 | 96.1 | 0.71 |
| Invention sample 2 | 900 | 4 | 0.4 | 1.0 | 3.0 | 95.6 | 0.71 |
| Invention sample 3 | 800 | 4 | 0.4 | 1.0 | 3.0 | 95.6 | 0.71 |
| Invention sample 4 | 800 | 4 | 0.4 | 1.0 | 2.0 | 96.6 | 0.71 |
| Invention sample 5 | 800 | 4 | 0.4 | 0.8 | 2.5 | 96.3 | 0.67 |
| Invention sample 6 | 800 | 3 | 0.4 | 1.0 | 2.5 | 96.1 | 0.71 |
| Invention sample 7 | 800 | 4 | 0.5 | 0.5 | 2.5 | 96.5 | 0.50 |
| Invention sample 8 | 800 | 4 | 0.4 | 1.0 | 2.5 | 96.1 | 0.71 |
| Invention sample 9 | 800 | 4 | 0.3 | 1.0 | 2.5 | 96.2 | 0.77 |
| Invention sample 10 | 800 | 4 | 0.4 | 1.0 | 4.0 | 94.6 | 0.71 |
| Invention sample 11 | 800 | 4 | 0.5 | 1.0 | 2.0 | 96.5 | 0.67 |
| Invention sample 12 | 800 | 4 | 0.4 | 1.0 | 2.0 | 96.6 | 0.71 |
| Invention sample 13 | 800 | 5 | 0.4 | 1.0 | 3.0 | 95.6 | 0.71 |
| Comparative sample 1 | 800 | 4 | 0.4 | 1.0 | 4.0 | 94.6 | 0.71 |
| Comparative sample 2 | 800 | 4 | 0.4 | 1.0 | 2.0 | 96.6 | 0.71 |
| Comparative sample 3 | 850 | 4 | 0.4 | 1.0 | 3.0 | 95.6 | 0.71 |
| Comparative sample 4 | 800 | 4 | 0.4 | 1.0 | 3.0 | 95.6 | 0.71 |
| Comparative sample 5 | 700 | 4 | 0.4 | 1.0 | 3.0 | 95.6 | 0.71 |
| Comparative sample 6 | 800 | 4 | 0.4 | 1.0 | 2.0 | 96.6 | 0.71 |
| Comparative sample 7 | 800 | 5 | 0.8 | 0.5 | 2.0 | 96.7 | 0.38 |

TABLE 3

| | Coating layer | | | | |
|---|---|---|---|---|---|
| | Lower layer $(Al_xTi_{1-x})N$ | | Upper layer $(Al_yTi_{1-y})N$ | | |
| Sample No. | Atomic ratio of Al element, x | Average thickness (μm) | Atomic ratio of Al element, y | Average thickness (μm) | Total thickness (μm) |
| Invention sample 1 | 0.90 | 5.0 | 0.80 | 2.0 | 7.0 |
| Invention sample 2 | 0.90 | 2.0 | 0.80 | 10.0 | 12.0 |
| Invention sample 3 | 0.90 | 10.0 | 0.80 | 2.0 | 12.0 |
| Invention sample 4 | 0.90 | 5.0 | 0.80 | 1.0 | 6.0 |
| Invention sample 5 | 0.90 | 1.0 | 0.80 | 5.0 | 6.0 |
| Invention sample 6 | 0.64 | 5.0 | 0.80 | 2.0 | 7.0 |
| Invention sample 7 | 0.90 | 5.0 | 0.52 | 2.0 | 7.0 |
| Invention sample 8 | 0.95 | 5.0 | 0.80 | 2.0 | 7.0 |
| Invention sample 9 | 0.90 | 5.0 | 0.85 | 2.0 | 7.0 |
| Invention sample 10 | 0.90 | 5.0 | 0.80 | 2.0 | 7.0 |
| Invention sample 11 | 0.80 | 7.0 | 0.70 | 5.0 | 12.0 |
| Invention sample 12 | 0.90 | 5.0 | 0.80 | 2.0 | 7.0 |
| Invention sample 13 | 0.90 | 3.0 | 0.80 | 2.0 | 5.0 |
| Comparative sample 1 | 0.90 | 5.5 | 0.80 | 0.5 | 6.0 |
| Comparative sample 2 | 0.90 | 0.5 | 0.80 | 5.5 | 6.0 |
| Comparative sample 3 | 0.90 | 2.0 | 0.80 | 14.0 | 16.0 |
| Comparative sample 4 | 0.90 | 14.0 | 0.80 | 2.0 | 16.0 |

TABLE 3-continued

| | Coating layer | | | | |
|---|---|---|---|---|---|
| | Lower layer $(Al_xTi_{1-x})N$ | | Upper layer $(Al_yTi_{1-y})N$ | | |
| Sample No. | Atomic ratio of Al element, x | Average thickness (μm) | Atomic ratio of Al element, y | Average thickness (μm) | Total thickness (μm) |
| Comparative sample 5 | 0.90 | 5.0 | 0.80 | 2.0 | 7.0 |
| Comparative sample 6 | 0.45 | 5.0 | 0.80 | 2.0 | 7.0 |
| Comparative sample 7 | 0.90 | 5.0 | 0.35 | 2.0 | 7.0 |

Measurement of GOS Value

In the sample of the coated cutting tool, a cross section was exposed by polishing in a direction substantially parallel to the substrate surface at 0.5 μm from the surface of the lower layer or the upper layer toward the substrate. Using EBSD (manufactured by TexSEM Laboratories, Inc.), each measurement region of the cross section in the lower layer and the upper layer was divided into regular hexagonal measurement points (hereinafter also referred to as "pixels"). As to each of the divided pixels, the orientation of the pixel was measured by obtaining Kikuchi patterns from reflected electrons from an electron beam which had been incident on the cross section (polished surface) of the sample. The obtained orientation data was analyzed using analysis software for the EBSD, thereby calculating various parameters. The measurement conditions were as set forth below: the acceleration voltage was 15 kV, the size of the measurement region was 30 μm×50 μm, and the distance (step size) between adjacent pixels was 0.05 μm. When there was a misorientation of 5 degrees or more between adjacent pixels, it was defined as a grain boundary. Further, a region surrounded by grain boundaries was defined as one crystal grain. However, a pixel that was present independently with a misorientation of 5 degrees or more with all the adjacent pixels was not considered as a crystal grain, and two or more pixels connected together were treated as a crystal grain. Further, the misorientation in a crystal grain between two different pixels in the same crystal grain was calculated, and the averaged value thereof was defined as the GOS value. That is, the GOS value was calculated by the following formula (5).

$$GOS = \frac{\sum_{i,j=1}^{n} \alpha_{ij(i \neq j)}}{n(n-1)} \quad (5)$$

in the formula (5), n represents the number of pixels in the same crystal grain, i and j represent numbers assigned to different pixels in the crystal grain (where 1≤i and j≤n), $\alpha_{ij}$ (i≠j) represents the crystal misorientation obtained from the crystal orientation at pixel i and the crystal orientation at pixel j.

The measurement under the abovementioned measurement conditions and measurement range was carried out in five fields of view. Next, the total number of pixels belonging to the crystal grains that constitute the lower layer or the upper layer was obtained, the GOS value was divided at intervals of 1 degree, and the number of pixels in the crystal grains in which the GOS value was included in the range of this value was aggregated and divided by the total number of pixels to create a histogram indicating the area ratio of the GOS value in the lower layer or the upper value. The area ratio $GOS_l$ of the crystal grains having a GOS value of 1 degree or lower in the lower layer and the area ratio $GOS_s$ of the crystal grains having a GOS value of 1 degree or lower in the upper layer were obtained based on the created histogram. The results are shown in Table 4.

Measurement of KAM Value

The KAM value in the lower layer and the upper layer was measured as follows. In the sample of the coated cutting tool, a cross section was exposed by polishing in a direction substantially parallel to the substrate surface at 0.5 μm from the surface of the lower layer or the upper layer toward the substrate. Using EBSD (manufactured by TexSEM Laboratories, Inc.), each measurement region of the cross section in the lower layer and the upper layer was divided into regular hexagonal measurement points (hereinafter also referred to as "pixels"). As to each of the divided pixels, the orientation of the pixel was measured by obtaining Kikuchi patterns from reflected electrons from an electron beam which had been incident on the cross section (polished surface) of the sample. The obtained orientation data was analyzed using analysis software for the EBSD, thereby calculating various parameters. The measurement conditions were as set forth below: the acceleration voltage was 15 kV, the size of the measurement region was 30 μm×50 μm, and the distance (step size) between adjacent pixels was 0.05 μm. From among the pixels adjacent to a pixel serving as a measurement center, pixels which each had a misorientation of 5 degrees or more with respect to such pixel were excluded from the calculation of KAM values as such excluded pixels were each regarded as straddling the grain boundary of the monocrystal where the pixel serving as a measurement center was located. That is, a KAM value was obtained as an average value of the misorientation of a pixel located in a crystal grain and the misorientations of the pixels which were adjacent to such pixel and which did not straddle the grain boundary of such crystal grain. That is, the KAM value was calculated by the following formula (6).

$$KAM = \frac{\sum_{j=1}^{n} \alpha_{i,j}}{n} \quad (6)$$

in the formula (6), n represents the number of pixels j adjacent to an arbitrary pixel i in the same crystal grain, and $\alpha_{i,j}$ represents the crystal misorientation obtained from the crystal orientation at the pixel i and the crystal orientation at the pixel j.

Then, the KAM value at all pixels constituting the entire area of the measurement region was calculated in the lower layer or the upper layer, and the ratio of the measurement points (pixels) with the KAM value of 1 degree or lower when the total number of the measurement points (pixels)

was taken as 100% was determined. The ratio of the measurement points at which the KAM value was 1 degree or lower was a numerical value obtained by averaging the ratios obtained for the measurement regions at any three locations. Further, the ratio of the measurement points where the KAM value was 1 degree or lower in the lower layer was represented as $KAM_i$, and the ratio of the measurement points where the KAM value was 1 degree or lower in the upper layer was represented as $KAM_s$. The measurement results are shown in Table 4.

TABLE 4

| Sample No. | Lower layer $KAM_i$(%) | Upper layer $KAM_s$(%) | Lower layer $GOS_i$(%) | Upper layer $GOS_s$(%) | Relation between GOS values |
|---|---|---|---|---|---|
| Invention sample 1 | 73 | 87 | 22 | 74 | $GOS_i < GOS_s$ |
| Invention sample 2 | 53 | 91 | 20 | 86 | $GOS_i < GOS_s$ |
| Invention sample 3 | 50 | 82 | 14 | 68 | $GOS_i < GOS_s$ |
| Invention sample 4 | 52 | 68 | 25 | 62 | $GOS_i < GOS_s$ |
| Invention sample 5 | 70 | 79 | 36 | 78 | $GOS_i < GOS_s$ |
| Invention sample 6 | 55 | 80 | 26 | 72 | $GOS_i < GOS_s$ |
| Invention sample 7 | 63 | 77 | 24 | 70 | $GOS_i < GOS_s$ |
| Invention sample 8 | 78 | 80 | 32 | 75 | $GOS_i < GOS_s$ |
| Invention sample 9 | 64 | 69 | 20 | 72 | $GOS_i < GOS_s$ |
| Invention sample 10 | 52 | 52 | 18 | 55 | $GOS_i < GOS_s$ |
| Invention sample 11 | 68 | 85 | 16 | 82 | $GOS_i < GOS_s$ |
| Invention sample 12 | 79 | 80 | 54 | 85 | $GOS_i < GOS_s$ |
| Invention sample 13 | 69 | 73 | 20 | 68 | $GOS_i < GOS_s$ |
| Comparative sample 1 | 52 | 53 | 25 | 54 | $GOS_i < GOS_s$ |
| Comparative sample 2 | 62 | 72 | 44 | 62 | $GOS_i < GOS_s$ |
| Comparative sample 3 | 47 | 92 | 22 | 84 | $GOS_i < GOS_s$ |
| Comparative sample 4 | 26 | 81 | 14 | 68 | $GOS_i < GOS_s$ |
| Comparative sample 5 | 88 | 31 | 62 | 20 | $GOS_s < GOS_i$ |
| Comparative sample 6 | 48 | 70 | 35 | 64 | $GOS_i < GOS_s$ |
| Comparative sample 7 | 37 | 67 | 26 | 62 | $GOS_i < GOS_s$ |

Using the obtained Invention Samples 1 to 13 and Comparative Samples 1 to 7, a cutting test was conducted under the following conditions.

Cutting Test 1
Workpiece material: AISI 4140,
Cutting speed: 300 m/min,
Feed rate per blade: 0.20 mm/t,
Depth of cut: 2.0 mm,
Cutting width: 76 mm,
Coolant: none,
Evaluation items: the tool life was assumed to be reached when the sample was fractured or the maximum flank wear width reached 0.3 mm, and the machining length up to the tool life was measured. Further, when the machining length was 3.0 m, the number of thermal cracks generated in the coated cutting tool was measured. The measurement results are shown in Table 5.

TABLE 5

| | Cutting test | |
|---|---|---|
| | Number of thermal cracks generated at machining length of 3.0 m | Machining length (m) |
| Invention sample 1 | 0 | 17 |
| Invention sample 2 | 0 | 19 |
| Invention sample 3 | 1 | 13 |
| Invention sample 4 | 1 | 12 |
| Invention sample 5 | 0 | 11 |
| Invention sample 6 | 0 | 13 |
| Invention sample 7 | 0 | 15 |
| Invention sample 8 | 0 | 17 |
| Invention sample 9 | 0 | 16 |
| Invention sample 10 | 1 | 10 |
| Invention sample 11 | 0 | 15 |
| Invention sample 12 | 0 | 11 |
| Invention sample 13 | 0 | 13 |
| Comparative sample 1 | 3 | 5 |
| Comparative sample 2 | 0 | 8 |
| Comparative sample 3 | 3 | 3 |
| Comparative sample 4 | — | 1 |
| Comparative sample 5 | 2 | 3 |
| Comparative sample 6 | 0 | 5 |
| Comparative sample 7 | 0 | 7 |

* Since the Comparative Sample 4 was fractured at a machining length of 1 m, the number of thermal cracks was not measured.

The results shown in Table 5 indicate that in all invention samples, when the working length was 3.0 m, the number of thermal cracks generated in the coated cutting tool was 1 or less, and the machining length up to the tool life was 10 m or more. Meanwhile, all the comparative samples had the machining length up to the tool life of 7 m or less, and the comparative samples 1, 3 and 5 had two or more thermal cracks in the coated cutting tool. Therefore, it can be seen that the wear resistance and fracture resistance of the invention samples are generally superior to those of the comparison samples.

From the above results, it was found that the invention samples have a long tool life as a result of being excellent in wear resistance and fracture resistance.

INDUSTRIAL APPLICABILITY

Since the coated cutting tool of the present invention has excellent wear resistance and fracture resistance, the tool life can be extended as compared with the prior art, and from such a viewpoint, the coated cutting tool of the present invention has industrial applicability.

REFERENCE SIGNS LIST

1: Substrate, 2: Lower layer, 3: Upper layer, 4: Coating layer, 5: Coated cutting tool.

What is claimed is:

1. A cutting tool comprising a substrate and a coating layer formed on the substrate, wherein the coating layer comprises, in order from a side closer to the substrate, a lower layer that comprises a compound having a composition represented by following formula (1), and an upper layer that is formed on the lower layer and comprises a compound having a composition represented by following formula (2), $$(Al_xTi_{1-x})N \quad (1)$$

in the formula (1), x represents an atomic ratio of the Al element to a total of the Al element and the Ti element, and satisfies $0.60 \leq x \leq 0.95$, $$(Al_yTi_{1-y})N \quad (2)$$

in the formula (2), y represents an atomic ratio of the Al element to a total of the Al element and the Ti element, and satisfies $0.50 \leq y \leq 0.85$;

an average thickness of the lower layer is 1.0 μm or more and 10.0 μm or less, and the average thickness of the upper layer is 1.0 μm or more and 10.0 μm or less; and an area ratio $GOS_i$ of crystal grains having a GOS value of 1 degree or lower in the lower layer and an area ratio $GOS_s$ of crystal grains having a GOS value of 1 degree or lower in the upper layer satisfy a condition represented by following formula (3), $$GOS_i < GOS_s \quad (3).$$

2. The cutting tool according to claim 1, wherein a ratio $KAM_i$ of measurement points showing a KAM value of 1 degree or lower in the lower layer is 50% or more and 90% or less, and a ratio $KAM_s$ of measurement points showing a KAM value of 1 degree or lower in the upper layer is 50% or more and 95% or less.

3. The coated cutting tool according to claim 1, wherein the $GOS_s$ is 55% or more and 90% or less.

4. The coated cutting tool according to claim 1, wherein the $GOS_i$ is 10% or more and less than 55%.

5. The coated cutting tool according to claim 1, wherein the atomic ratio x of the Al element in the lower layer and the atomic ratio y of the Al element in the upper layer satisfy a condition represented by following formula (4):

$$y < x \quad (4).$$

6. The coated cutting tool according to claim 1, wherein an average thickness of the entire coating layer is 3.0 μm or more and 15.0 μm or less.

7. The coated cutting tool according to claim 1, wherein the substrate is any of a cemented carbide, a cermet, a ceramic, and a cubic boron nitride sintered body.

8. The coated cutting tool according to claim 2, wherein the $GOS_s$ is 55% or more and 90% or less.

9. The coated cutting tool according to claim 2, wherein the $GOS_i$ is 10% or more and less than 55%.

10. The coated cutting tool according to claim 3, wherein the $GOS_i$ is 10% or more and less than 55%.

11. The coated cutting tool according to claim 8, wherein the $GOS_i$ is 10% or more and less than 55%.

12. The coated cutting tool according to claim 2, wherein the atomic ratio x of the Al element in the lower layer and the atomic ratio y of the Al element in the upper layer satisfy a condition represented by following formula (4):

$$y < x \quad (4).$$

13. The coated cutting tool according to claim 3, wherein the atomic ratio x of the Al element in the lower layer and the atomic ratio y of the Al element in the upper layer satisfy a condition represented by following formula (4):

$$y < x \quad (4).$$

14. The coated cutting tool according to claim 4, wherein the atomic ratio x of the Al element in the lower layer and the atomic ratio y of the Al element in the upper layer satisfy a condition represented by following formula (4):

$$y < x \quad (4).$$

15. The coated cutting tool according to claim 8, wherein the atomic ratio x of the Al element in the lower layer and the atomic ratio y of the Al element in the upper layer satisfy a condition represented by following formula (4):

$$y < x \quad (4).$$

16. The coated cutting tool according to claim 9, wherein the atomic ratio x of the Al element in the lower layer and the atomic ratio y of the Al element in the upper layer satisfy a condition represented by following formula (4):

$$y < x \quad (4).$$

17. The coated cutting tool according to claim 10, wherein the atomic ratio x of the Al element in the lower layer and the atomic ratio y of the Al element in the upper layer satisfy a condition represented by following formula (4):

$$y < x \quad (4).$$

18. The coated cutting tool according to claim 11, wherein the atomic ratio x of the Al element in the lower layer and the atomic ratio y of the Al element in the upper layer satisfy a condition represented by following formula (4):

$$y < x \quad (4).$$

19. The coated cutting tool according to claim 2, wherein an average thickness of the entire coating layer is 3.0 μm or more and 15.0 μm or less.

20. The coated cutting tool according to claim 3, wherein an average thickness of the entire coating layer is 3.0 μm or more and 15.0 μm or less.

* * * * *